(12) United States Patent
Nguyen

(10) Patent No.: US 6,593,867 B2
(45) Date of Patent: Jul. 15, 2003

(54) HIGH PERFORMANCE BUS INTERFACE

(75) Inventor: Cap van Nguyen, Dallas, TX (US)

(73) Assignee: VDV Media Technologies, Inc., Dallas, TX (US)

( * ) Notice: Subject to any disclaimer, the term of this patent is extended or adjusted under 35 U.S.C. 154(b) by 10 days.

(21) Appl. No.: 09/774,310

(22) Filed: Jan. 31, 2001

(65) Prior Publication Data

US 2002/0140592 A1 Oct. 3, 2002

(51) Int. Cl.[7] .............................................. H03M 1/66
(52) U.S. Cl. ........................ 341/144; 326/60; 375/214
(58) Field of Search ................................. 341/144, 148, 341/50, 51; 360/40, 41; 326/60, 59; 375/214, 286

(56) References Cited

U.S. PATENT DOCUMENTS 3,719,934 A * 3/1973 Behr et al. .................... 360/41
5,684,482 A * 11/1997 Galton ........................ 341/144
6,140,841 A * 10/2000 Suh ............................. 326/60

FOREIGN PATENT DOCUMENTS

GB          2 269 727          * 2/1994

* cited by examiner

*Primary Examiner*—Jean Bruner Jeanglaude
(74) *Attorney, Agent, or Firm*—Nguyen, P.C.; Linh T. Nguyen

(57) ABSTRACT

A system and method of implementing a high performance digital bus interface. Digital signals present on a plurality of digital bus signal lines are amplitude encoded into a single signal and coupled to a transmission medium. The encoded signal is received and decoded by a complimentary decoder. The amplitude levels are discriminated and converted into digital symbols, each having a plurality of bits, which are coupled to a second digital bus. Digital signals are amplitude encoded at levels related by powers of two so that no encoding ambiguity is created. In wide data bus implementations, a plurality of encoder/decoders can be used. Bi-directional bus implementations are also taught.

33 Claims, 9 Drawing Sheets

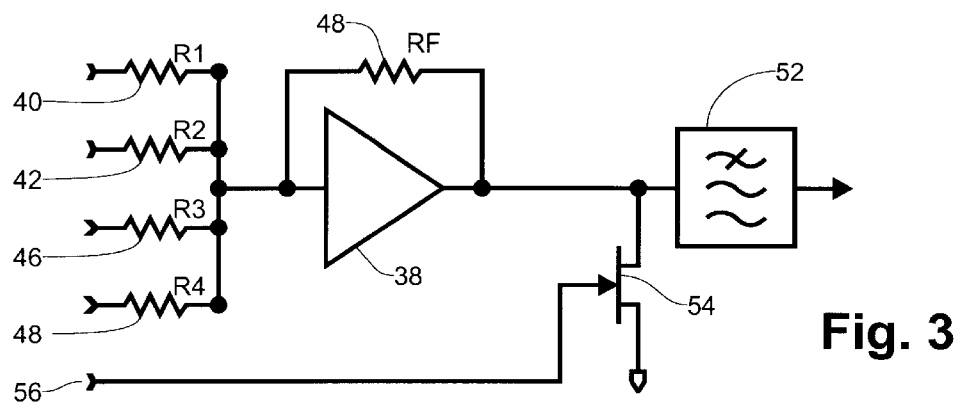
Fig. 3
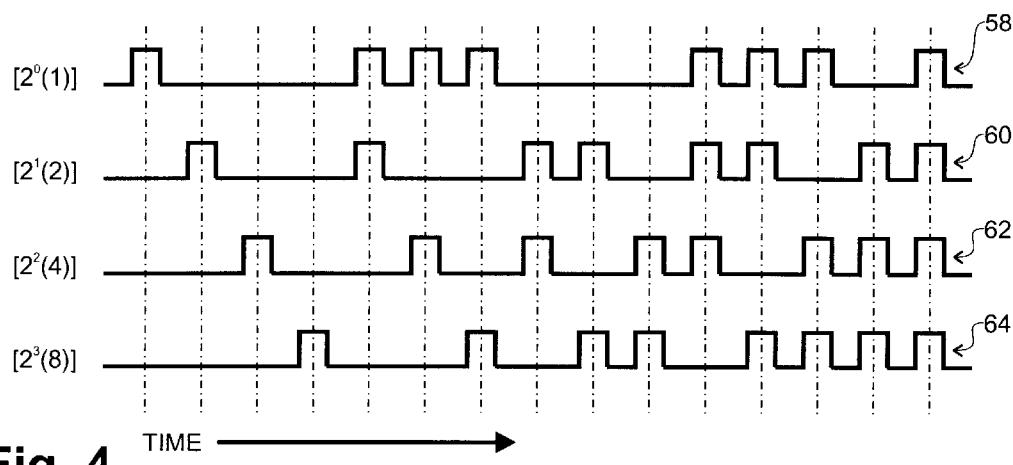
Fig. 4 TIME →
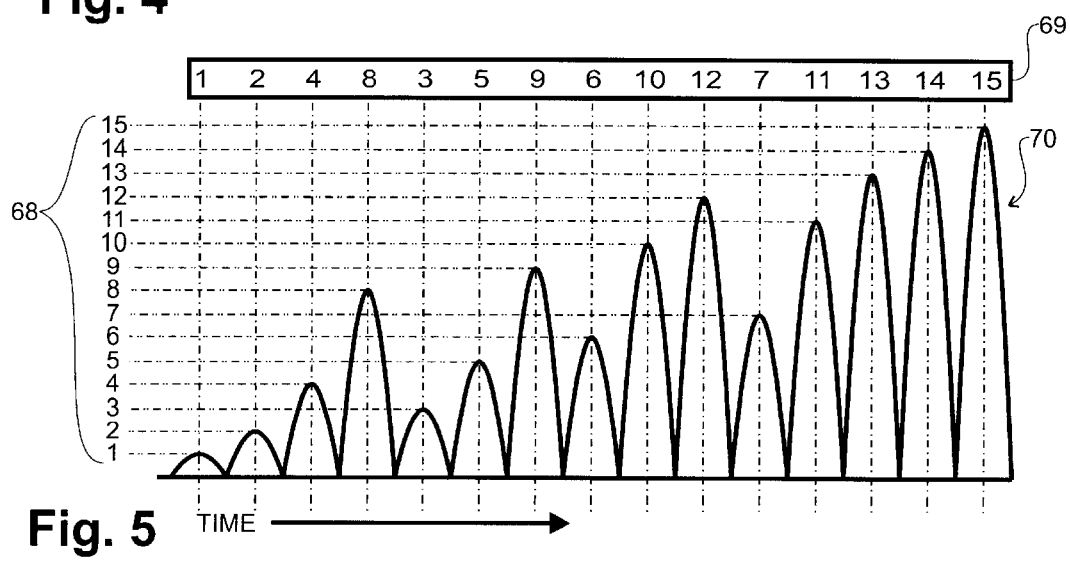
Fig. 5 TIME →

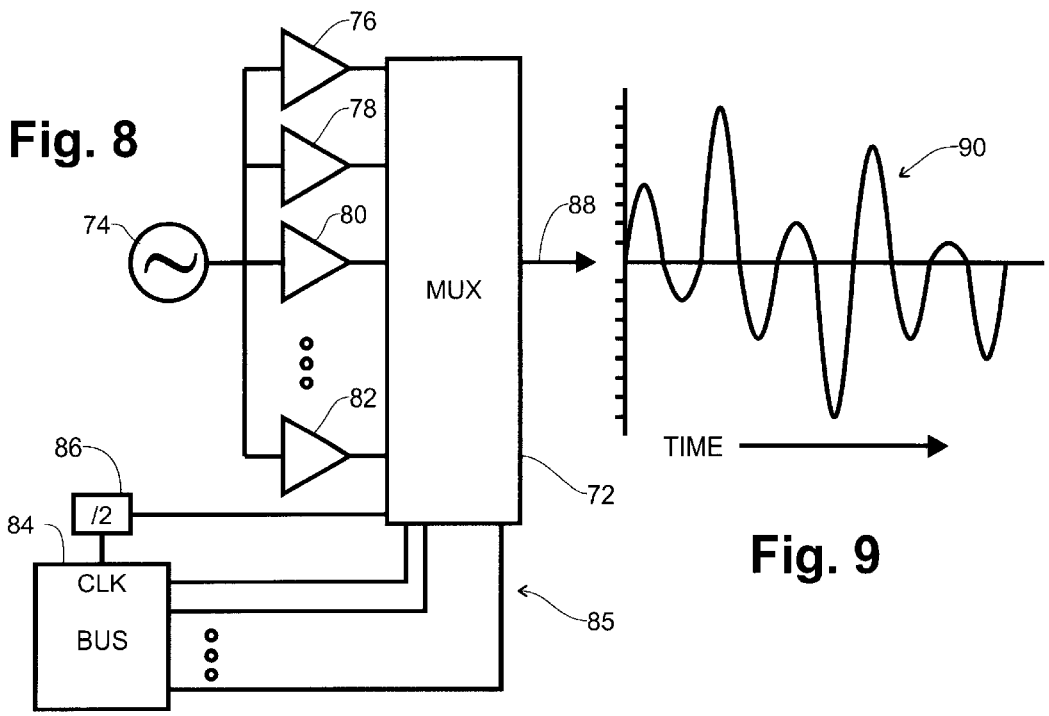
Fig. 8
Fig. 9
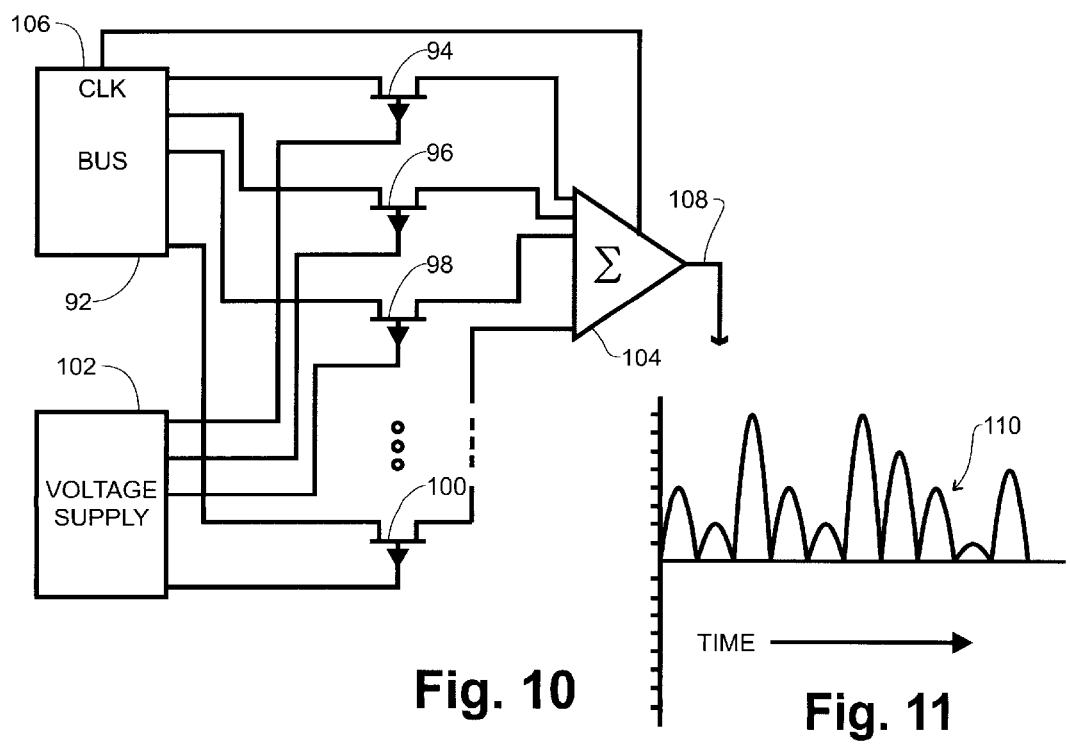
Fig. 10
Fig. 11

HIGH PERFORMANCE BUS INTERFACE

BACKGROUND OF THE INVENTION

1. Field of the Invention

The present invention relates to data communications. More specifically, the present invention relates to parallel data bus interfaces.

2. Description of the Related Art

Digital signaling plays dominant role in modern computer and electronics products. Computers, microprocessors, DSP and microcontrollers are used in a vast array of consumer, commercial, and government applications. Devices such as kitchen appliances and children's toys now routinely utilize computers. Obviously, the use of personal computers has become commonplace. Computers are used in automotive and commercial applications as well. As shared aspect of virtually all computer applications is the need for computers, processors, microprocessors and microcontrollers to communicate digital information within the devices themselves, as well as to peripheral devices. Peripheral devices include other computers, memory, input/output controllers, DSP's, multi-function peripherals, mass storage devices, printers, network devices and a host of other interface devices.

The preferred means of communicating digital information among and between computers and peripherals is the digital data bus. This type of bus is the standard because of its simplicity and its ability to convey a large amount of data simultaneously, by virtue of the parallel communications paths inherent is such a bus. In addition to the data bus, digital buses are used for addressing and control as well. Parallel digital buses are used for communications within integrated devices, such as personal computers, as well as communications with external peripheral devices.

The simplicity of the parallel digital bus does impose certain limitations and problems. Each bus requires that a large number of circuit conductors be deployed to accomplish the desired interconnections. A large number of conductors require a proportionally large amount of printed circuit board area, or 'real estate'. Similarly, if cabling is utilized, the cables must also comprise a large number of circuit conductors to implement a parallel digital bus. Of course, the interface connectors become large and more cumbersome. There is an obvious cost penalty associated with the foregoing as well, including larger printed circuit boards, or boards with a greater number of conductive layers. Also, bigger and more expensive cables and connectors. Another aspect of parallel data bus interfaces is the electrical characteristics. Parallel conductors are prone to EMI and cross talk. This can degrade system performance, especially in environments where system performance is being pushed to the limits of modern design. Also, the longer the cable run, the more likely electrical problems are to occur. Distributed impedances grow in magnitude as cabling run lengths increase. Digital square-wave pulses become distorted and signaling reliability goes down.

The market trends in computer technology of all kinds are pushing for faster and smaller devices. Higher reliability continues to be an important goal in systems design. Digital buses become wider as more parallel data paths are needed to meet system performance requirements. Printed circuit board trace routings are pushed ever closer together, exacerbating electrical and propagation issues. Thus there is a need in the art for a high performance digital parallel bus interface and interconnection scheme to mitigate the foregoing issues.

SUMMARY OF THE INVENTION

The need in the art is addressed by the apparatus and methods taught in the present invention. In a first embodiment, a data encoder for combining several data lines into a single medium is taught. The encoder comprises a plurality of signal converters, each having an input for receiving one of a plurality of binary signals, and an output for outputting a discrete amplitude level when the received binary signal is active. Also, an amplitude adder having a plurality of inputs coupled to the outputs of the plurality of signal converters, and an output for outputting an encoded signal according to the sum of the input amplitudes. In a refinement of this invention, the plurality of binary signals includes a clock signal, and the decoder further comprises a clock interface coupled to the amplitude adder and operative to receive the clock signal and gate the output of the amplitude adder in accordance therewith. In one embodiment, the plurality of binary signals are structured as a digital bus.

At a higher level of integration, all of the elements are disposed within an integrated circuit and the amplitude adder output couples to an external connection of the integrated circuit. In a further refinement, output discrete amplitude levels of the plurality of signal converters are related by binary orders of magnitude. The invention may also comprise a low pass filter, having an input coupled to the output of the amplitude adder, and an output for outputting the encoded signal with reduced bandwidth.

An alternative embodiment is taught, which comprises a sinusoidal signal source, a plurality of gain stages, each having an input coupled to the sinusoidal signal source, an output, and a discrete gain value. Also, an analog multiplexer having a plurality of inputs coupled to the outputs of the plurality of gain stages, and a plurality of control inputs coupled to a data bus, and an output for outputting the signal present on a selected one of the plurality of inputs according to the present state of the data bus. In a refinement of this invention, the data bus includes a clock signal, and further comprises a clock interface coupled to the analog multiplexer and operative to receive the clock signal and gate the output of the analog multiplexer in accordance therewith. In another refinement, all of the elements are disposed within an integrated circuit and the analog multiplexer output couples to an external connection of the integrated circuit. In another refinement, the discrete gain values are related by binary orders of magnitude. In another refinement, the encoder further comprises a low pass filter having an input coupled to the output of the analog multiplexer, and an output.

In addition to the encoder, the present invention also teaches a data decoder. The data decoder comprises an amplitude discriminator having an input for receiving an amplitude encoded signal, and a plurality of outputs, each activated according to a discrete amplitude level. Also, a symbol generator having a plurality of inputs coupled to the plurality of outputs of the amplitude discriminator, and a plurality of outputs for outputting a predetermined binary symbol according to which of the plurality of inputs receives an active signal. In a refinement of this invention, the amplitude encoded signal includes a sequence of discrete amplitude levels, and it further comprises a clock recovery circuit coupled to the amplitude encoded signal and operable to output a clock signal in synchronous with the sequence of discrete amplitude levels. The clock signal is further coupled to the symbol generator and operable to gate the plurality of outputs in accordance therewith.

In a refinement of the data decoder, the plurality of outputs are structured as a digital bus. In a further refinement, all of the elements are disposed within an integrated circuit and the amplitude discriminator input couples to an external connection of the integrated circuit.

The present invention also teaches several methods of implementing the inventive concepts taught herein. The first is a method of encoding a plurality of data signals into an encoded signal. It comprising the steps of generating a plurality amplitude levels discretely corresponding to the plurality of data signals, and summing the plurality of amplitude levels to produce an amplitude encoded signal. In a refinement of the foregoing, the plurality of binary signals includes a clock signal, and the method further comprises the step of synchronizing a sequence of amplitude encoded signals in accordance with the clock signal. In a further refinement, the plurality of data signals are structured as a digital bus. In a further refinement, the plurality of amplitude levels are related by binary orders of magnitude. In a further refinement, the amplitude levels are positive voltage levels. In a further refinement, the amplitude levels are negative voltage levels. In a further refinement, the amplitude levels alternate between positive and negative voltage levels. In a further refinement, the method further comprises the step of filtering a portion of the high frequency energy from the amplitude-encoded signal, thereby reducing the total signal bandwidth requirements.

In a compliment to the foregoing encoding method, the present invention teaches a method of decoding an encoded signal into a plurality of data signals. This method comprises the steps of discriminating a present one of a plurality of peak signal amplitudes to a predetermined binary symbol, and coupling each bit of the symbol to a discrete data signal. In a refinement of this method, the encoded signal includes a sequence of peak signal amplitudes, and the method further comprises the steps of recovering a clock signal in synchronous with the sequence of signal amplitudes, and gating the coupling step in accordance with the recovered clock signal. In a further refinement, the plurality of data signals are structured as a digital bus. In a further refinement, the peak signal amplitudes are positive voltage levels. In a further refinement, the peak signal amplitudes are negative voltage levels. In a further refinement, the peak signal amplitudes alternate between positive and negative voltage levels.

In another method of practicing the present invention, a method of communicating a plurality of data signals is taught. This method comprises the steps of generating a plurality of amplitude levels discretely corresponding to a plurality of data signals and summing the plurality of amplitude levels to produce an amplitude encoded signal. Then, coupling the encoded signal through a communications medium and discriminating the amplitude level of the amplitude encoded signal in accordance with one of a plurality of predetermined binary symbols. Finally, coupling each bit of the symbol to a discrete data signal. The ways of refining the previously discussed methods are applicable to this method as well.

In a further advancement in the art, the present invention teaches a method of bi-directional communications of data signals through a communications medium. This method comprises the steps of repeatedly generating a plurality amplitude levels discretely corresponding to a plurality of data signals and repeatedly summing the plurality of amplitude levels to produce a first sequence of amplitude encoded signals. Then, synchronizing the first sequence of amplitude encoded signals with a first portion of a series of clock cycles and coupling the first sequence of encoded signals through a communications medium. At the same time, receiving a second sequence of amplitude encoded signals from the communications medium and discriminating the amplitude of the second sequence of amplitude encoded signals, occupying a second sequence of clock cycles, each in accordance with one of a plurality of predetermined binary symbols. Then, coupling each bit of the symbols to a discrete data signal. In a refinement to this method, the first sequence of amplitude encoded signals are encoded with positive voltage levels and the second sequence of amplitude encoded signals are encoded with negative voltage levels. In a further refinement, the method further comprises the step of recovering the series of clock cycles from the second series of amplitude encoded signals.

BRIEF DESCRIPTION OF THE DRAWINGS

FIG. 3 is a schematic diagram of an illustrative embodiment transmitter.

FIG. 4 is a data diagram of four-line bus signals.

FIG. 5 is a time domain diagram of a four-bit symbol AADM waveform in an illustrative embodiment of the present invention FIG. 6, comprising

FIG. 8 is a functional block diagram of an illustrative embodiment bus interface transmitter.

FIG. 9 is a time domain diagram of an AADM bus signal.

FIG. 10 is a functional block diagram of an illustrative embodiment bus interface transmitter.

FIG. 11 is a time domain diagram of an AADM bus signal.

DESCRIPTION OF THE INVENTION

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention is applicable for use in a digital computer environment where large amounts of address, data, and control information must be transferred in wide digital parallel buses. For example, in a PC computer, buses as wide as sixty-four, or more, parallel data paths are employed to communicate information between processors, memory, and various peripheral devices. As was discussed earlier, this can place large constraints on system design because routing these large numbers of circuit paths among various devices consumes a great amount of printed circuit board area, or 'real-estate'. It also often causes designers to add additional layers to the printed circuit boards to accommodate the large number or circuit paths. The problem is exacerbated when two devices that are not located on the same printed circuit board must be interconnected with a large number of parallel communications paths. In this case, some form of connector and/or cabling is required. Using large, multiple conductor connectors and cabling drives up system cost and increases the likelihood of wiring problems and generally reduces reliability.

Figure 1:
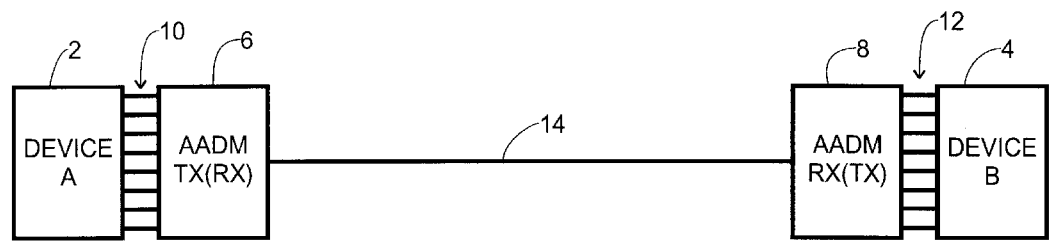
FIG. 1 is a block diagram of an illustrative embodiment of the present invention.

FIG. 1 is a functional block diagram illustrating an illustrative embodiment of the present invention. A first device 'A' 2 is to be interconnected to a second device 'B' 4 through a digital parallel interface. Device 'A' 2 has eight paths 10 and Device 'B' 4 has eight paths 12 as well. Traditionally, these eight circuit paths were merely interconnected to accomplish the interface. In the present invention, the eight discrete data signals 10 from Device 'A' 2 are first combined buy an AADM encoder/transmitter (or transceiver) 6 and then transmitted over a single communications medium to an AADM decoder/receiver (or transceiver) 8 where the encoded data is decoded back to the individual data paths 12 and coupled to Device 'B' 4. Thus, the need for eight separate data paths is obviated by implementation of the present invention. The present invention is scalable and eight paths have been selected in this discussion for the sake of clarity only.

The acronym, and trademark, 'AADM' stands for Asymmetric Amplitude Direct Modulation and is generally the subject of a separate patent application entitled METHOD AND APPARATUS FOR MODULATING A SIGNAL, Ser. No. 09/619,003, and filed on Jul. 19, 2000, and invented by C. Nguyen, the inventor of the present invention, and assigned to the same assignee. The contents of that application are hereby incorporated by reference thereto. However, the present application will develop herein the essential aspects of AADM necessary to practice the present invention.

As will become clear hereinafter, the scalability of the AADM modulation scheme in the present invention has upper limits constrained by noise, power, and other system and environmental consideration. Stated in a most general way, the number of signal amplitude levels 'a' needed to encode a given number of data paths 'n' can be as high as:

$$a = 2^n$$

In tabular form, this relationship is:

| Data Paths | Amplitude Levels |
| --- | --- |
| 4 | 16 |
| 8 | 256 |
| 12 | 4096 (4 k) |
| 16 | 65,536 (64 k) |
| 20 | 1 Meg. |
| 24 | 16 Meg. |

Figure 2:
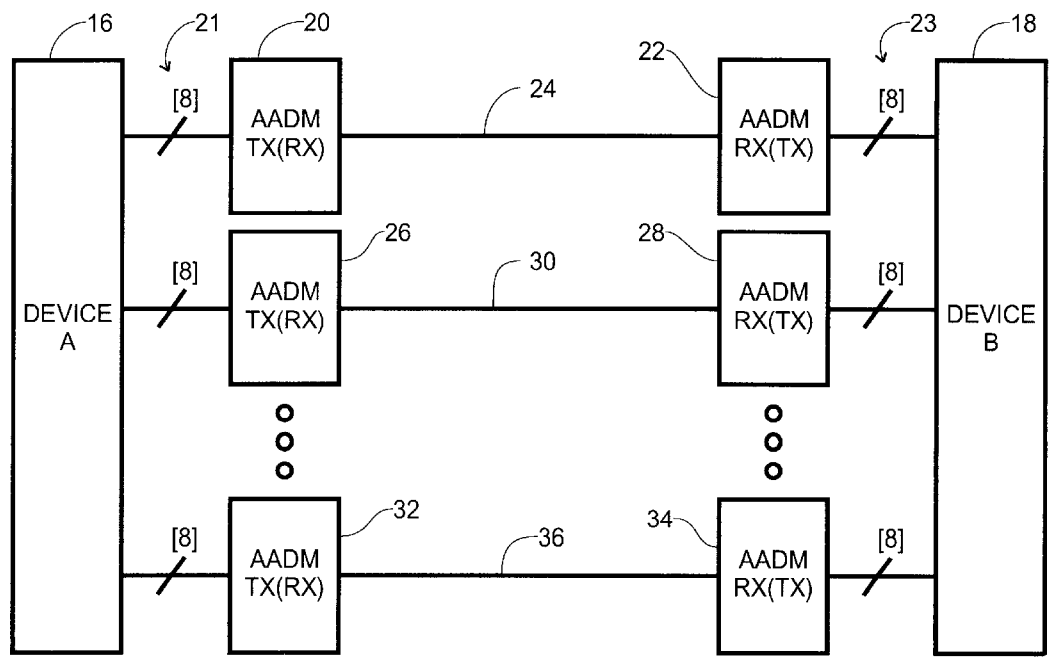
FIG. 2 is a bock diagram of an illustrative embodiment of the present invention.

Thus, it is understood that each discrete level is representative of a binary order of magnitude. It is practical to discriminate 4 k amplitude levels quite readily, levels of 64 k are achievable, and even higher in environments low in noise. Regardless of what the upper limit of discriminating AADM signal levels is, the present invention is readily scalable by operating parallel communications medium, as is illustrated in FIG. 2. In FIG. 2, a first device 'A' 16, having a large number of parallel data paths 21 is to be interconnected to a second device 'B' 18 having a corresponding large number of data paths 23. The data paths are grouped eight at a time, in this example, and coupled to a plurality if AADM transceivers 20, 26, and 32. The ellipses between AADM transceiver 26 and 32 indicate that any number could be used to meet the requirements of the data bus width. For example, if the data bus was 64 bits wide, eight transceivers each accommodating eight data paths could be employed. Or, four transceivers each accommodating sixteen data paths could be employed. The AADM transceivers 20, 26, and 32 are coupled to communications media 24, 30, and 36 respectively. These are coupled to corresponding AADM transceivers 22, 28, and 34 respectively. These, in turn, couple through data lines 23 into device 'B' 18. It is to be understood that the groupings of eight data lines is an arbitrary choice in this example, and could be another number depending upon the system design and environmental consideration. In any event, the effect of applying the present invention is to divide the number of data line circuit paths required. The number of circuit paths required is equal to the total original data paths divided by the number of data paths each AADM transceiver combines.

It is understood by those of ordinary skill in the art that a typical data bus presents one of two binary signal levels on each of the data bus circuit paths, and presents a clock pulse which indicates to any receiving device that the data, or data set, is stable and ready to be read by the receiving device. Thus, the timing of a data bus is typically referenced to a clock signal, wherein a predetermined state or transition in the clock signal is indicative of a data set being ready for reading by a receiving device. FIG. 3 illustrates an illustrative embodiment encoder-transmitter according to the present invention. This embodiment combines four data lines into a single medium, for illustrative purposes. The four data lines are input to resistors R1 40, R2 42, R3 44, and R4 46. Each of the resistors is coupled to the input of a summing amplifier 38. A feedback resistor RF 48 couples the output of summing amplifier 38 to its input. Thus, the gain of each data signal through amplifier 38 is set by the ratio of the input resistor and the feedback resistor. Therefore, the amplitude of each data signal at the output of amplifier 38 can be set by selecting the values of the input and feedback resistors.

Assuming that amplifier 38 has an adequately fast slew rate, then the output of amplifier 38 will present a square waveform with the amplitude set by the gain through the various data inputs. Further, the input levels will be added, and factored by the individual gains to produce an output signal which amplitude is set by the sum of the gains of the various inputs, and the existence, or not, of an active data signal at the input (typically a logical one, or zero). Thus, a plurality of digital inputs are combined and encoded onto an amplitude of a signal, which may be varied as voltage or current levels. In situations where the data path is short, and the bandwidth of the data carrying medium is relatively high, then unfiltered, amplitude encoded data can be directly coupled to the communications medium. However, it is often times not desirable to transmit a square waveform over a communications medium. Such a waveform includes higher level harmonics that require the medium to have a very large bandwidth in order to accurately propagate the waveform. The present invention, and the AADM modulation scheme in general, reduce this bandwidth requirement by filtering the waveform to render a more sinusoidal waveform that requires a much narrower bandwidth for accurate propagation. In FIG. 3, this is accomplished by using to a low pass filter 52 to reduce the energy in the higher order harmonics. The corner frequencies are selected based on the data clock rate so that the ultimate output of the circuit in FIG. 3 is bandwidth limited and nearly sinusoidal in form, although the amplitude varies depending upon the state of the data set at the input.

In FIG. 3, another important aspect of the design is the implementation of a clock signal to the data encoder and transmitter. Since amplifier 38 provides a continuous output, the transitions of data levels at the input will be reflected nearly instantly at the output, and the distinction between sinusoidal pulses would be lost. To prevent this, the output of amplifier 38 is clamped to ground through transistor 54, as the clock pulses are received. On each clock pulse, the output is shorted to ground and thus the amplitude level goes to zero. The clocking signal can be a rising or falling clock edge, or a single shot edge pulse, either positive or negative going. During the valid data time period, the output is allowed to pass and the summed voltage level of the combined data input is thus presented at the output of the encoder/transmitter. Transistor 54 may be substituted with a unijuction transistor, which has characteristics suitable for this clock operation, as will be appreciated by those of ordinary skill in the art. Or, transistor 54 can be substituted with any suitable semiconductor switching device, such as a bipolar transistor, an FET, or other technology, as is understood by those of ordinary skill in the art.

It is important to select the various data gain levels carefully so that the summed voltage will not present any ambiguity to the decoder that ultimately must discriminate the data. Refer to FIG. 4 and FIG. 5 to gain a better understanding of this issue. FIG. 4 illustrates four data signals 58, 60, 62, and 64, which are exemplary of the time variant data signals on the data input lines (items 40, 42, 44, and 46 in FIG. 3). In the preferred embodiment, the gain values are selected according to integer powers of the number two. The data on signal 58 is multiplied by a factor of two to the zero power (which is a level of zero or one). The data on signal 60 is multiplied by a factor of two to the first power (which is a level of zero or two). The data on signal 62 is multiplied by a factor of two to the second power (which is a level of zero of four). Finally, the data on signal 84 is multiplied by a factor of two to the third power (which is a level of zero or eight). By using this approach, the sum of any combination of signals in the four inputs results in a unique voltage level at the output. Those of skill in the art will appreciate that other gain calculations could be used to avoid ambiguity, and that each fall within the scope of the present invention.

Again referring to FIG. 4, the broken lines indicate moments in time where the data on the four data lines is valid. The row of numbers in block 69 indicate the numeric sum of the data levels across all four data lines. Thus, when signal 58 is active and all others are inactive, the signal level is one (e.g. one plus zero plus zero plus zero). This is indicated by the first position in time during which the data on signals 58, 60, 62, and 64 is valid. Similarly, the last position in time in FIG. 4 where the data is valid shows that all four lines are active, thus the numeric sum is fifteen in box 69 (e.g. one plus two plus four plus eight). The other possible combinations of data bits and the summed signal levels related thereto are readily determinable by reference to FIG. 4

Reference is now directed to FIG. 5, which is a time domain signal level diagram of the output of the circuit depicted in FIG. 3, having received the data input signals depicted in FIG. 4. The signal amplitude levels are numerically represented by the column of numbers 68. The signal waveform 70 shows the output signal as a function of time. Since the summed square wave waveforms have been filter to limit bandwidth, the waveform becomes nearly sinusoidal. The peak signal level is maintained and indicates the sum of the applied, amplified, data signal levels. The signal 70 peak amplitudes also conform to the levels indicated in box 69, as was previously described. Therefore, it can be readily understood that the input data signals are encoded into a signal amplitude and output to a transmission medium for subsequent decoding by a decoder, or receiver, device.

Figure 6A:
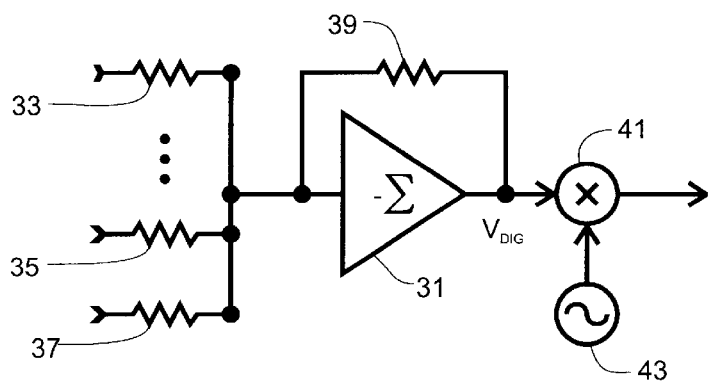
FIGS. 6A through 6E is a functional block diagram of an illustrative embodiment bus interface transmitter.

In FIG. 3, a square waveform is generated which encodes the amplitude information and then it is filtered to band limit the transmitted signal. There are another approaches that the system designer can employ to achieve similar results. Reference is directed to FIG. 6A, which is one such alternative design. A summing amplifier 31 is employed, and the gain of each data input is set by the ration of the feed back resistor 39 to the various input resistors 33, 35, and 37. The number of inputs utilized would correspond to the number of data lines that were encoded onto the output ($V_{DIG}$), according to system design considerations. Thus, the output from the summing amplifier 31 would take the exemplary form shown in FIG. 6C. That is, the waveform at $V_{DIG}$ would take the form of the waveform 45 in FIG. 6C. However, the circuit depicted in FIG. 6A differs from that in FIG. 3, in that a reference oscillator 43 and a mixer 41 are advantageously employed to band limit the final output signal. The sinusoidal waveform output by oscillator 43 has the same period as the data bus clock signal. Therefore, when the square-wave form data signal of FIG. 6C is mixed with the sinusoidal oscillator 43 signal, the output from mixer 41 takes the form of waveform 47 in FIG. 6D. This waveform 47 is an amplitude encoded, sinusoidal form wave, which is inherently band limited. Note also, in FIG. 6D, that the clock period, represented by dashed lines 53, corresponds to the output waveform signal 47. It should be appreciated, that the receiving circuit can readily extract this clock reference from the received signal.

Figure 6D:
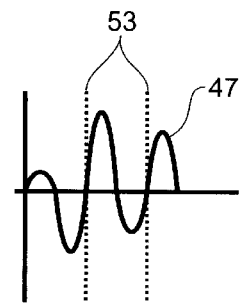
Figure 6C:
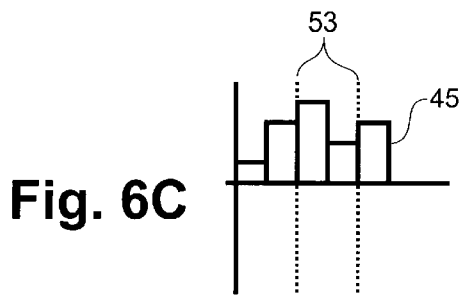
Figure 6B:
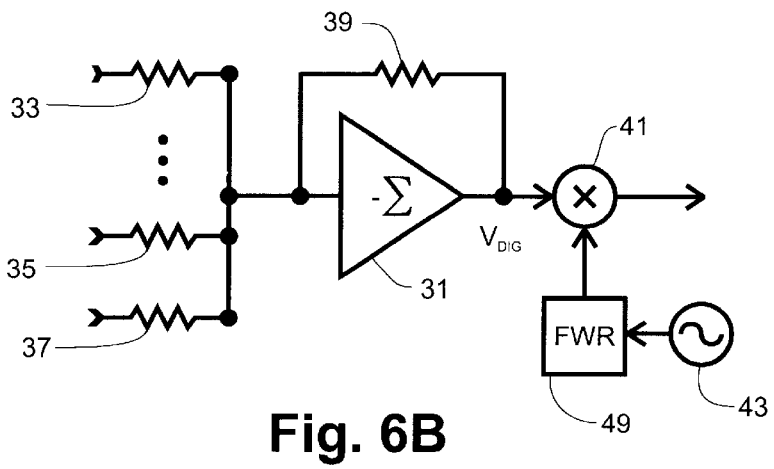
Figure 6E:
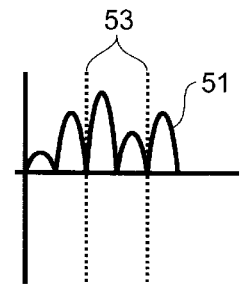

The signal shown in FIG. 6D, which is output from the circuit shown in FIG. 6A, has both positive and negative going pulses. In some situations, as will become clear hereinafter, the system design may require pulses limited to only either the positive or negative going polarities. The circuit shown in FIG. 6B provided such a single polarity output waveform. The summing amplifier 31 and resistors 33, 35, 37, and 39 are arranged in the same fashion as those in FIG. 6A. Thus, the output of the summing amplifier is also $V_{DIG}$, as illustrated in FIG. 6C. Where the circuit in FIG. 6B differs is in that fact that oscillator 43 is rectified through full wave rectifier 49 so that the input to mixer 41 is a pulse train of positive (or negative) only going sinusoidal waves. When this signal is mixed with the $V_{DIG}$ signal, the output is a waveform as illustrated in FIG. 6E. Thus, waveform 51 takes the form of positive going sinusoidal pulses. Note that the data bus clock reference 53 is aligned with the output pulse waveform 51.

Figure 7A:
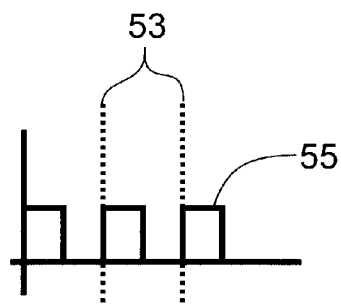
FIG. 7 is a time domain diagram of an AADM bus signal.
Figure 7B:
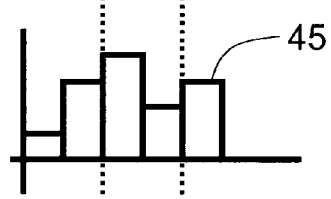
Figure 7C:
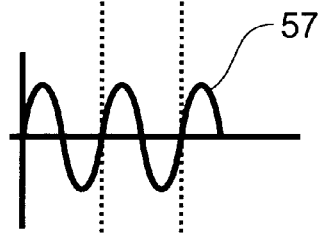
Figure 7D:
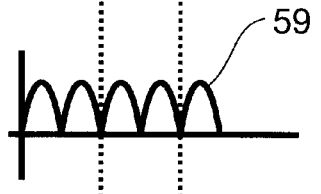
Figure 7E:
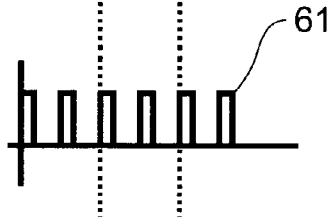

The timing relationship is better understood by reference to FIGS. 7A through 7E. All of these figures are oriented in time by thee clock period as indicated by dashed lines 53. FIG. 7A illustrates the bus clock signal 55. FIG. 7B illustrates the digitally amplitude encoded waveform 45 that is output from the summing amplifier 31. FIG. 7C illustrates the oscillator 43 waveform 57. FIG. 7D illustrates the rectified oscillator 43 signal, as was discussed respecting FIG. 6B. Finally, FIG. 7E illustrates the one-shot pulse waveform 61 as could be applied to control the output signal, discussed more thoroughly with respect to FIG. 3.

The circuits depicted and described with reference to FIGS. 3 and 6 are but a few of many designs that can be contemplated by those of skill in the art to accomplish the present invention decoder. Reference is directed to FIG. 8, which illustrates another illustrative embodiment of the present invention encoder circuit. In this instance, a sinusoidal signal generator 74 whose frequency is synchronous with the data bus clock 84 is used to generate the output signal in a piecemeal fashion. The signal output from the sinusoidal generator 74 is fed to the inputs of several gain stages 76, 78, 80, and 82. These gain stages could be amplifiers, or they could be passive dividers, reducing the signal amplitude. Also, the number of gain stages would correspond to the number of signal levels possible, given the number of data input signals. In the preferred embodiment, the gain levels of the various gain stages are related by powers of two, as has been discussed hereinbefore. The outputs of the gain stages 76, 78, 80, and 82 are coupled to the plurality of inputs of an analog multiplexer 72. From time to time, various ones of the inputs are coupled to the output 88 of the multiplexer 72. Since each input has a difference gain value, the output sinusoidal signal peak amplitude is defined by which of the inputs is selected from time to time. FIG. 9 illustrates a typical output waveform 90. Notice that both the positive and negative going waveforms are encoded with peak signal levels in this embodiment.

Again referring to FIG. 8, it is data bus 84 that provides the input data signals. These signals are coupled to the selection lines of the multiplexer 88. In the case of an eight input multiplexer, for example, there would naturally be three selection lines. Any combination of data inputs will certainly specify a unique multiplexer 72 input, which will have coupled to it a unique signal level by virtue of the selection of the gain values. Synchronization of the selection of data inputs is accomplished by using the clock output 84 of the data bus and dividing it by two at block 86. The division by two is needed because data is encoded onto each half-cycle of the waveform. Thus, two data clock cycles are encoded onto each sinusoidal wave cycle of the output, so division by two is dictated. Naturally, the approach to encoding under the present invention depicted in FIG. 8 is readily scalable as are all the other approaches taught herein.

The present invention is applicable to digital circuitry and those of skill in the art will appreciate that such circuitry achieves the greatest economies when a very high level of integration is applied. It may appear that the present invention has some limitations in that the number of signal levels becomes rather high as the width of the data bus increases. The inputs to a decoder may be 256, or 1024, or 4096, 64 k or more circuit paths. And, each path will require some kind of device to control the signal amplitude level. However, it should be noted that modern VLSI devices and microcontrollers now have millions of semiconductor devices disposed upon their tiny surfaces. Thus, even a circuit that requires tens of thousands of circuit devices to implement becomes a very small fraction of the silicon substrate 'real estate' in a modern integrated circuit. Weighed against the substantial savings in device pin count and printed circuit board real estate saved, the economies weigh in favor of reducing the number of circuit paths needed to communicate digital information among digital devices.

FIG. 10 depicts an illustrative embodiment encoder design according to the present invention that is particularly well suited to implementation on silicon in a modern integrated circuit. A summing device 104 is used to accumulate the voltage levels of the various data signals, in a fashion similar to that described respecting FIG. 3. However, in FIG. 10, the input gain is controlled by transistors 94, 96, 98, and 100. Or however many transistors are required for a particular application. The transistors in this illustration are P-channel FET's that may be of the MOS or CMOS variety. Rather than operating these transistors in the saturation or cut-off regions of their forward transfer characteristics, they are biased into the linear region. Thus, the Source-Drain resistance can be controlled by properly setting the Gate voltage. The proper Gate voltage is set by voltage supply 100. This supply may be as simple as a plurality of series resistors coupling the system supply voltage to ground, or semi-conductive devices, such as diodes or transistors may be arranged to produce the required gradient of output voltages needed to bias the transistors 94, 96, 98, and 100. The digital signal inputs are taken from a digital bus 92 and coupled to the transistors 94, 96, 98, and 100. The transistors are coupled, in turn, to the inputs of the summing device 104. The output of the summing device 108 provides the amplitude encoded data stream as was described hereinbefore. Note that filtering the multiplier or gating circuit would be applied to this output (not shown) to limit bandwidth and force a sinusoidal-like output, as illustrated in the time domain waveform 110, illustrated in FIG. 11. As was also discussed earlier, the bus clock signal 106 is used to gate the summing device 104 to force the output to zero volts between each amplitude-encoded peak. Thus, by principally using transistors to implement the present invention in this embodiment, it is readily adaptable to silicon integrated circuit designs.

Another aspect of the present invention that should be noted is the fact that the encoded signal returns to zero, or crosses zero, between each amplitude-encoded peak. This allows the decoder, or receiver, to synchronize with the encoder, or transmitter, and to recover the bus clock signal if needed.

The decoder function of the present invention performs the converse function of the encoder. It samples the amplitude encoded signal and discriminates the various amplitude levels, then converts them into a group of bits, called 'symbols' that are subsequently coupled to a plurality of data signals, thus recreating the original digital bus signals. As the time variant amplitude levels are decoded, the time variant data signals are recreated, in turn.

Figures 12, 13:
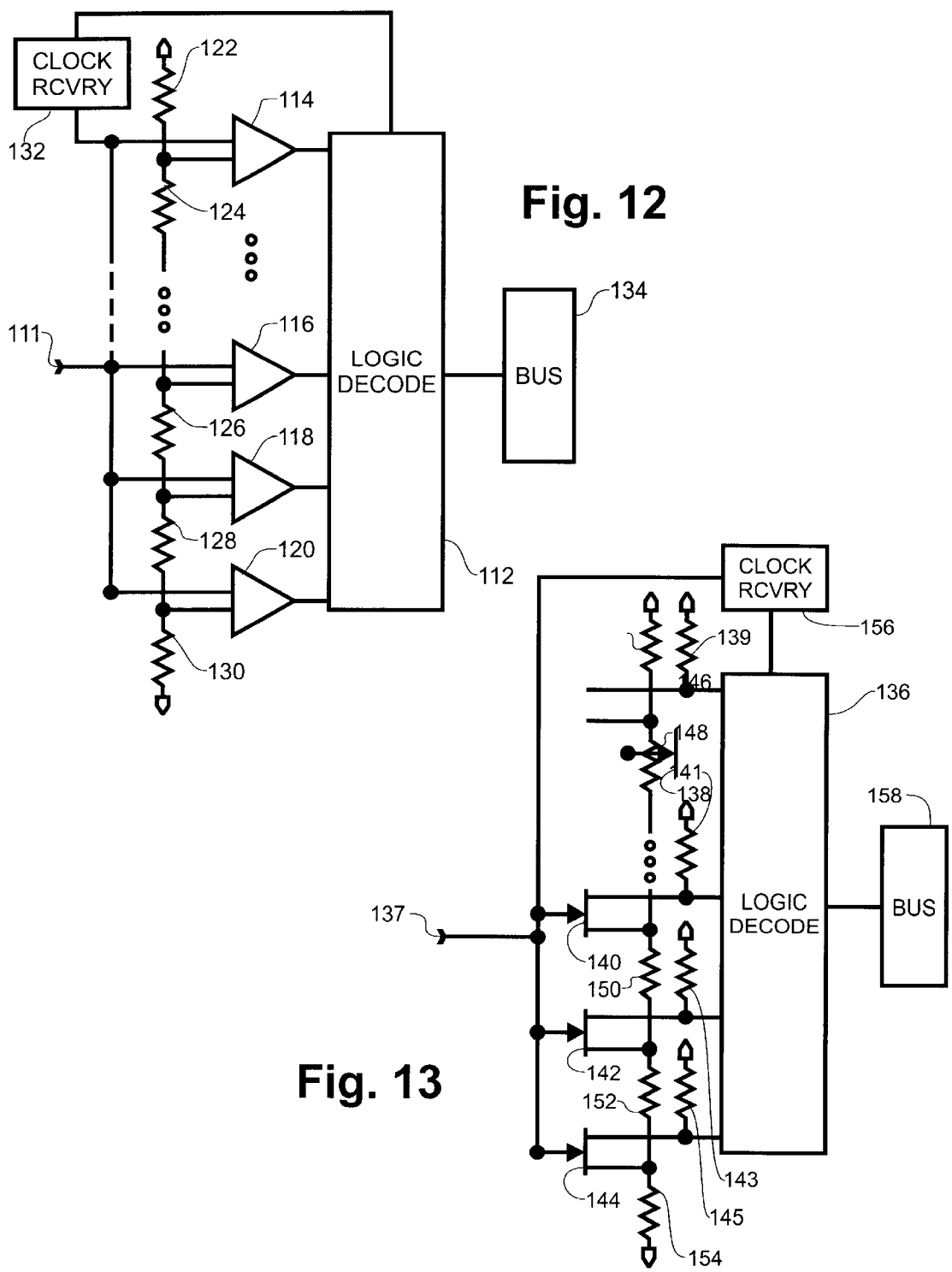
FIG. 12 is a functional block diagram of an illustrative embodiment bus interface receiver.
FIG. 13 is a functional block diagram of an illustrative embodiment bus interface receiver.

Reference is directed to FIG. 12, which is a functional block diagram of an illustrative embodiment decoder according to the present invention. The amplitude-encoded signal enters at point 111. It is distributed to a suitable number of comparators, identified as items 114, 116, 118, and 120 in FIG. 12. The reference for the comparators is taken from a voltage source similar to that described with respect to FIG. 12. In FIG. 12, the voltage source is comprised of resistors 122, 124, 126, 128, and 130, which are wired in series between the supply voltage and ground. Thus, the outputs taken from these resistors create a gradient of voltage levels directly corresponding to the gradient of amplitude levels in the received signals. As the signal peaks arrive, the comparators 114, 116, 118, and 120 turn on, and the logic decode circuit 112 detects the active signal from the highest voltage comparator that became active in the received signal. This is analogous to the peak detector circuit in an equalizer display, which is well understood in the art. The detected level is further decoded in logic decode circuit 112 to produce the group of bits, or the symbol, that represents the data word associated with the level of the peak amplitude received. This group of bits, or symbol, is coupled to the plurality of data bits in the digital bus.

The decoder function also operates in synchronous with a clock so that the availability of good data can be communicated to the receiving data bus. In some configurations, this may be achieved by merely sharing a common clock signal between all of the pertinent components in a system. Or, as depicted in FIG. 12, the decoder may recover the clock signal from the received amplitude-encoded signal. A clock recovery circuit 132 receives the amplitude-encoded data and recreates a binary clock signal therefrom. Such circuits are well understood by those of skill in the art. The recovered clock signal is coupled to the logic decode circuit and provides the signal that interprets both when a valid amplitude peak is received and when valid data has been presented to the bus 134 for use by subsequent devices.

FIG. 13 is a functional block diagram of an alternative illustrative embodiment of a decoding circuit according to the present invention. The design in FIG. 13 is more suitable for use on silicon because the comparators 138, 140, 142, and 144 are implemented from a single transistor or can be a circuit of several transistors. In this example, they are MOS FET's. The amplitude-encoded signal is received at point 137 and is coupled to the Gate inputs of these transistors, which present a high impedance to the arriving signals. The transistors are coupled to the nodes between resistors 146, 148, 150, 152, and 154, which provide the reference voltage gradient as has been described hereinbefore. The other conductor of the transistors form the input to the logic decode circuit 136, and are 'pulled-up' to the supply voltage by resistors 139, 141, 143, and 145. The function of the logic decode 136, clock recovery 156, and bus 158 are virtually the same as was described respecting FIG. 12.

Figure 14:
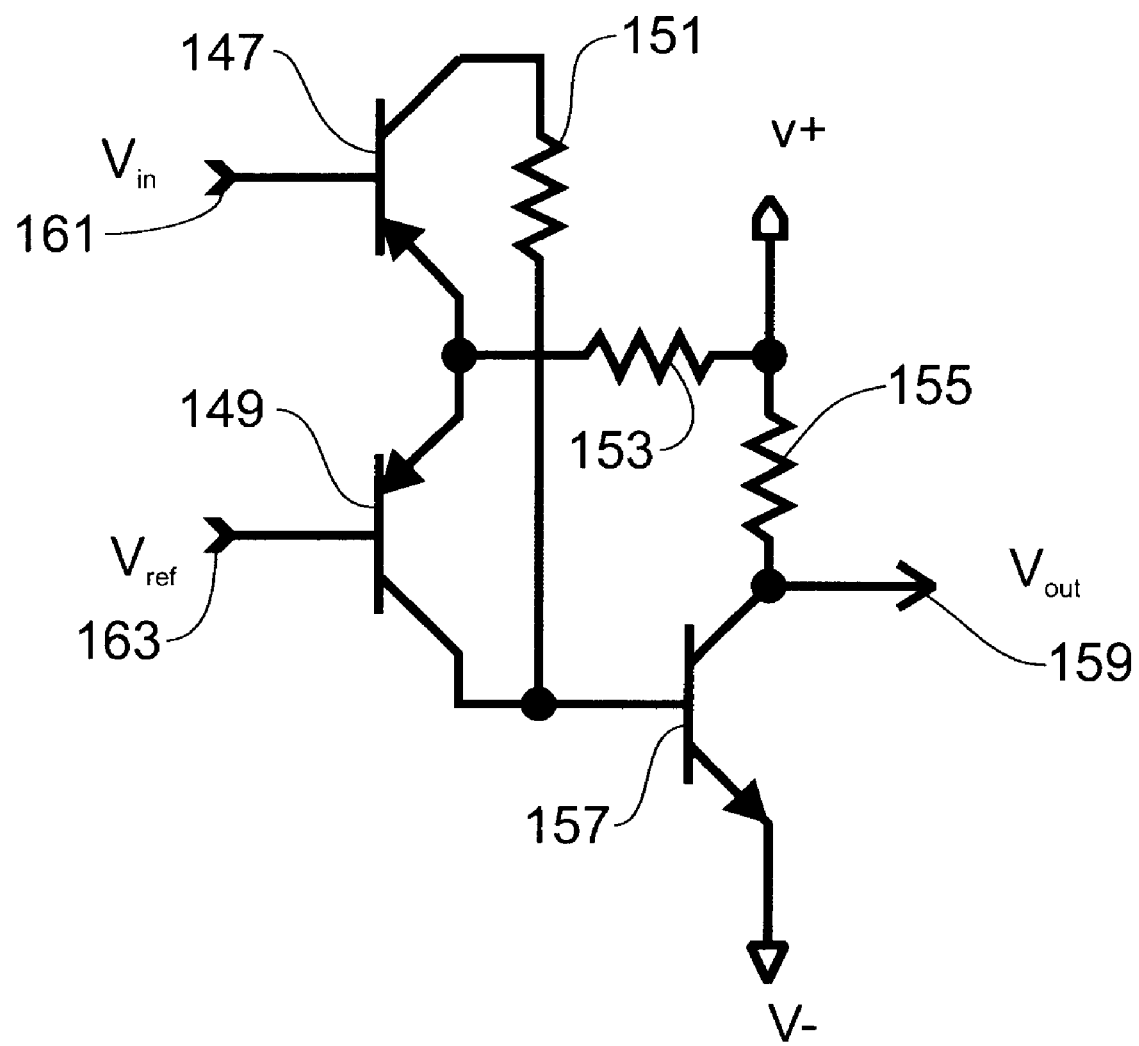
FIG. 14 is a time domain diagram of a forward channel AADM signal in an illustrative embodiment of the present invention.

FIG. 14 is an alternative circuit design to replace the summing nodes 114, 116, 118, and 120 in FIG. 12, or, the MOS FET's 138, 140, 142, and 144 in FIG. 13. The circuit in FIG. 14 is a proven comparator circuit implemented with a complimentary pair of transistors 147 and 149. The base of transistor 147 received the input signal 161, and the base of transistor 149 receives the reference voltage level 163 for the comparator. When the input signal exceeds the voltage level of the reference voltage, then the output 159 of the comparator goes high. Resistor 153 biases the complementary transistor and the output is taken from the collector of both transistors, with resistor 151 controlling current in the collector of transistor 147. The output is coupled to the base of driving transistor 157, which is biased by resistor 155. The final comparator output 159, a digital signal, is taken from the collector of transistor 157. Those of ordinary skill in the art will appreciate that similar comparator circuits can be readily implement using FET's, CMOS FET's and other semiconductor technologies.

Figure 15:
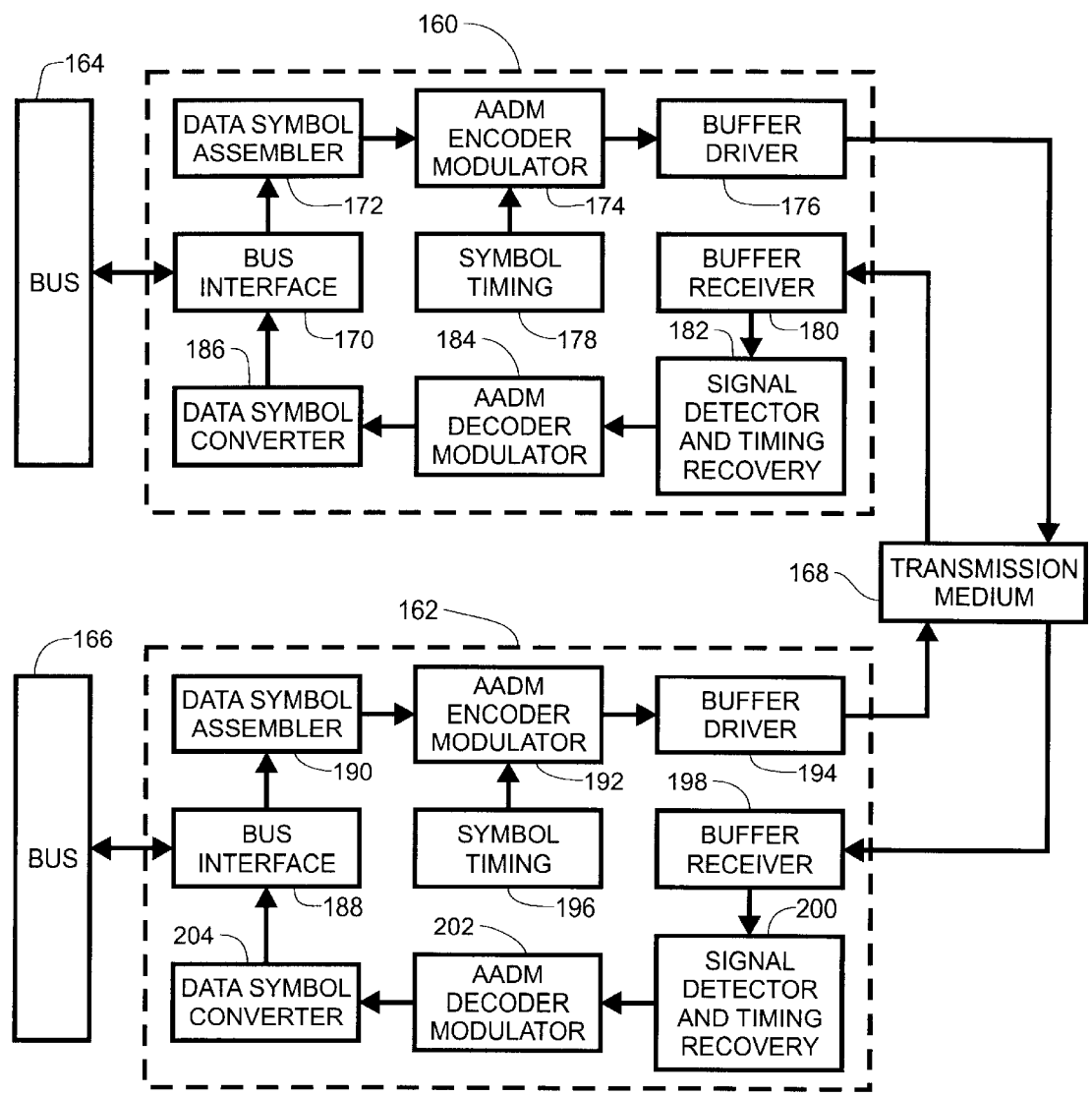
FIG. 15 is a functional block diagram of an illustrative embodiment bus transceiver.

With the encoder and decoder functions of the present invention established, a complete bi-directional system can be implemented. A bi-directional system interfaces two buses and allows for data flow from and to either bus. The transfer across a medium or mediums may be through separate paths, or may be multiplexed over as few as one path. Attention is directed to FIG. 15, which is a functional block diagram of a bi-directional system illustrative embodiment according to the present invention. A first digital bus 164 is coupled to a second digital bus 166. The systems generally include a first AADM transceiver 160 coupled though one or more transmission mediums 168 to a second AADM transceiver 162. The two transceivers are essentially identical, except one may be designated as the master and the other the slave. In that situation, the slave differs only in that it recovers the clock signal from the master's amplitude-encoded signals. When there is no designation of master/slave, then both transceivers share a common clock provided elsewhere in the system.

Respecting AADM transceiver (or encoder/decoder) 160 in FIG. 15, the bus 164 couples to a bus interface 170, which may be as simples as a plurality of electrical conductors, or may include circuitry to manage bus contention, such as tri-state drivers. Such concepts are well understood in the art. The bus interface 172 couples to a data symbol assembler, which may sub-divide the bus as discussed hereinbefore. This has the effect of dividing each group of data words presented by the bus into groups of symbols. The AADM encoder 174 generates the amplitude-encoded signal, as has been discussed hereinbefore. The amplitude-encoded signal is coupled though a buffer/driver 176 that matches the signal to the transmission medium 168, and may handle contention for the transmission medium in multiplexed applications.

The transmission medium used may be any of a great number of conductor types. The requirement depends upon the bus width, data rates, distance, and other environmental factors. In applications not requiring extremely high data rates, a simple two-layer resin-glass board may be used with little regard to how the traces are routed upon the board. This type of application is properly characterized as a low-speed design where the rise and fall times of the data signals is relatively fast compared to the duration of the signal pulses. In this situation, the characteristic impedance of the transmission medium is not very important in the system design. Of course, a prudent designer will consider this, as well as EMI and cross talk issues, but in a low speed design they are rarely a limiting factor in the design.

On the other hand, in a high-speed system design, the characteristics of the transmission medium become critical. A high speed system is one where the rise and fall time of the signals is fast enough that the signal can change from one state to another in less time than it takes for it to travel the length of the medium, and back. In such a system, the characteristic impedance of the communications medium must be carefully considered. These are situations where a stripline or microstrip feedline may be appropriate in printed circuit layouts, or, coaxial cabling in interconnection of systems. Since digital signals typically are comprised of pulses, the signals are, by definition, non-sinusoidal in nature. Being non-sinusoidal, the energy content of such signals is spread over a broad band of frequencies due to higher order harmonics. Fourier analysis can readily quantify such bandwidth requirements, but the essential principal is that non-sinusoidal signals require broad bandwidths. However, in high speed systems, the bandwidth requirements challenge the transmission medium and propagation issues arise.

In addition to combining a plurality of data signals into a single amplitude-encoded signal, the present invention deals with high-speed system issues by generating sinusoidal-like signals that require less bandwidth and are less prone to propagation issues than traditional square-wave signals. Thus, through the combination of sinusoidal-like signal characteristics and controlled impedance transmission mediums, the present invention can not only reduce the number of conductors required to coupled parallel data lines, it can also maximize the utilization of a given resource. In addition, the reduction of the total number of conductors within a circuit simplifies the design effort needed to avoid other interference, such as cross talk and EMI.

Referring again to FIG. 15, the return, amplitude-encoded signal received from transmission medium, 168 couple to buffer/receiver 180 in transceiver 160. The signal detector and timing recovery circuit 182 alerts that data is being received and recovers the clock signal, where this is required. The amplitude-encoded signal is coupled to AADM decoder 184 where the amplitude levels are correlated to symbols, as has been described hereinbefore. A data symbol converter organizes the symbols and aligns them with the receiving bus and couples them to the aforementioned bus interface 170, which couples them to the receiving bus 164.

The second transceiver 162 is functionally identical to the first transceiver 160, is its internal functions will not be recited, as they would merely reiterate those describing the first transceiver 160.

Figure 17:
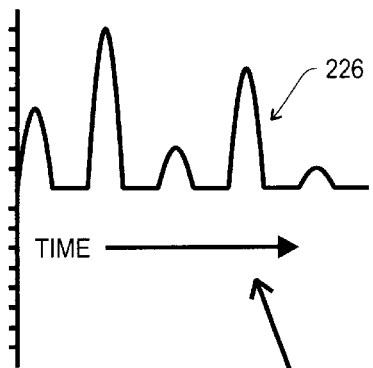
FIG. 17 is a time domain diagram of a forward channel AADM signal in an illustrative embodiment of the present invention.
Figure 16:
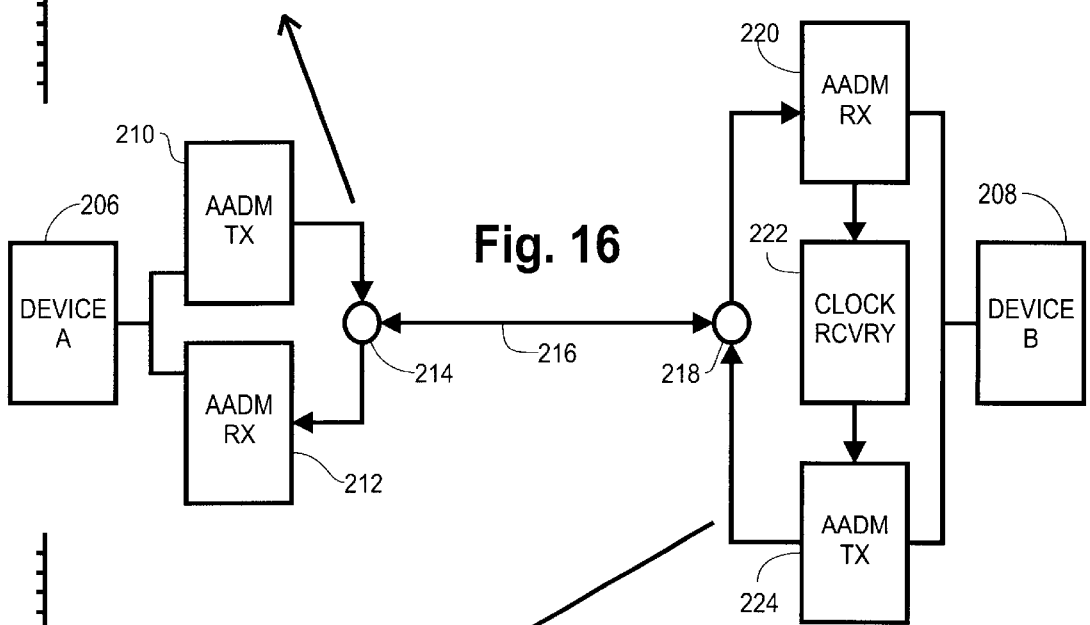
FIG. 16 is a functional block diagram of an illustrative embodiment AADM bus transceiver.

Reference is direct to FIG. 16, which is a functional block diagram of an illustrative embodiment of a bi-directional transceiver design according to the present invention. A first device 'A' 206 is to be bi-directionally coupled to a second device 'B' 208. Both interfaces are via parallel digital buses. An AADM transceiver comprising an AADM transmitter 210 and an AADM receiver 212 are coupled to device 'A' 206. The amplitude-encoded signal from the AADM transmitter/encoder is coupled to the transmission medium 216 via coupling node 214. The encoding function places a single symbol, encoding one bus word, on every other half-cycle of the output waveform. A time domain representation of such a signal is illustrated in FIG. 17 as item 226.

Figure 18:
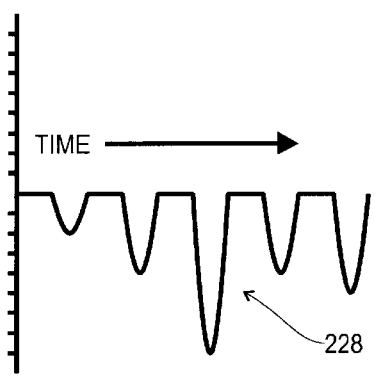
FIG. 18 is a time domain diagram of a reverse channel AADM signal in an illustrative embodiment of the present invention.
Figure 19:
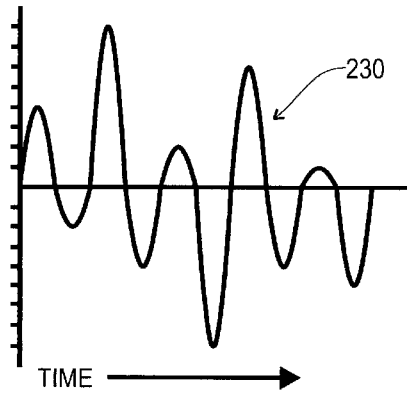
FIG. 19 is a time domain diagram of the combined forward and reverse AADM channels in an illustrative embodiment of the present invention.

Again referring to FIG. 16, the amplitude-encoded signal is coupled from transmission medium 216 to coupling node 218 where it subsequently couples to the AADM receiver 220, and is decoded into the digital symbols that are coupled to the digital data bus on device 'B' 208. If the system does not share a common clock signal, then the incoming signal to AADM receiver 220 is also coupled to clock recovery circuit 22 which is used to synchronize AADM transmitter 224. In a similar fashion to AADM transmitter 210, AADM transmitter 224 encodes a symbol from the parallel digital bus of device 'B' onto alternating half-cycles of the output waveform, as illustrated by waveform 228 in FIG. 18. Thus, in FIG. 16, coupling nodes 214 and 218 combine the signals transmitted from the two AADM transmitters onto the transmission medium. The timing relationship is controlled, either because of a single system clock, or because one the transceivers recovers clock from the other, so that the negative and positive going amplitude-encoded pulses are interlaced in time to form a composite signal, as illustrated by waveform 230 in FIG. 19. To achieve thus outcome, the sampling and clock rate of each transceiver must be doubled so that the data can be send in half as many clock cycles as are required for the data buses that are interface.

Thus, the present invention has been described herein with reference to a particular embodiment for a particular application. It is therefore intended by the appended claims to cover any and all such applications, modifications and embodiments within the scope of the present invention.

Accordingly,

What is claimed is:

1. A data encoder, comprising:
    a plurality of signal converters, each having an input for receiving one of a plurality of binary signals, and an output for outputting a unique amplitude level when one of said plurality of received binary signals is active;
    an amplitude adder having a plurality of inputs coupled to outputs of said plurality of signal converters, and an output for outputting an encoded signal according to a summation of input amplitudes, and
    a clock interface coupled to said amplitude adder and operative to gate said output of said amplitude adder in accordance with a clock signal.

2. The data encoder of claim 1, and wherein said clock signal is provided together with said plurality of binary signals.

3. The data encoder of claim 1, and wherein said plurality of binary signals are structured as a digital bus.

4. The data encoder of claim 1, and wherein said plurality of signal converters are implemented within an integrated circuit and said amplitude adder output couples to an external connection of said integrated circuit.

5. The data encoder of claim 1, and wherein the output unique amplitude levels of said plurality of signal converters are related by binary orders of magnitude.

6. The data encoder of claim 1, further comprising:
    a low pass filter having an input coupled to said output of said amplitude adder, and an output for outputting a second encoded signal with reduced higher order harmonic energy content.

7. A data encoder, comprising:
    a sinusoidal signal source;
    a plurality of gain stages, each having an input coupled to said sinusoidal signal source, an output, and a discrete gain value, and
    an analog multiplexer having plurality of inputs coupled to outputs of said plurality of gain stages, and having a plurality of control inputs coupled to a data bus, and having an output for outputting a signal present on a selected one of said plurality of inputs according to the present state of said data bus.

8. The data encoder of claim 7, and wherein the data bus includes a clock signal, further comprising:
    a clock interface coupled to said analog multiplexer and operative to receive the clock signal and to gate said output of said analog multiplexer in accordance therewith.

9. The data encoder of claim 7, and wherein said plurality of gain stages and said analog multiplexer are implemented within an integrated circuit and said analog multiplexer output couples to an external connection of said integrated circuit.

10. The data encoder of claim 7, and wherein said discrete gain values are related by binary orders of magnitude.

11. The data encoder of claim 7, further comprising:
    a low pass filter having an input coupled to said output of said analog multiplexer, and having an output.

12. A data decoder, comprising:
an amplitude discriminator having an input for receiving an amplitude encoded signal, and a plurality of outputs, each activated according to a discrete amplitude level, and
a symbol generator having a plurality of inputs coupled to said plurality of outputs of said amplitude discriminator, and having a plurality of outputs each for outputting a predetermined binary symbol according to which of said plurality of inputs receives an active signal.

13. The data decoder of claim 12, and wherein the amplitude encoded signal includes a sequence of discrete amplitude levels, further comprising:
a clock recovery circuit coupled to the amplitude encoded signal and operable to output a clock signal in synchronous with the sequence of discrete amplitude levels, said clock signal further coupled to said symbol generator and operable to gate said plurality of outputs in accordance therewith.

14. The data decoder of claim 12, and wherein said plurality of outputs are structured as a digital bus.

15. The data decoder of claim 12, and wherein said amplitude discriminator and said symbol generator are disposed within an integrated circuit and said amplitude discriminator input couples to an external connection of said integrated circuit.

16. A method of encoding a plurality of data signals into an encoded signal in a system having an amplitude adder with a clock interface operative to gate an output of the amplitude adder, comprising the steps of:
generating a plurality amplitude levels uniquely corresponding to the plurality of data signals, and
summing said plurality of amplitude levels to produce an amplitude encoded signal at the output upon receipt of a clock signal by the clock interface.

17. The method of claim 16, and wherein said clock signal is provided together with the plurality of binary signals.

18. The method of claim 16, and wherein said plurality of data signals are structured as a digital bus.

19. The method of claim 16, and wherein said plurality of amplitude levels are related by binary orders of magnitude.

20. The method of claim 16, and wherein said amplitude levels are positive voltage levels.

21. The method of claim 16, and wherein said amplitude levels are negative voltage levels.

22. The method of claim 16, and wherein said amplitude levels alternate between positive and negative voltage levels.

23. The method of claim 16, further comprising the step of:
filtering a portion of the high frequency energy from said amplitude encoded signal, thereby reducing the total signal bandwidth.

24. A method of decoding an encoded signal into a plurality of data signals, comprising the steps of:
receiving and discriminating a present one of a plurality of peak signal amplitudes to a predetermined binary symbol, and
coupling each bit of said symbol to a discrete data signal.

25. The method of claim 24, wherein the encoded signal includes a sequence of peak signal amplitudes, further comprising the steps of:
recovering a clock signal in synchronous with the sequence of signal amplitudes, and
gating said coupling step in accordance with said recovered clock signal.

26. The method of claim 24, and wherein said plurality of data signals are structured as a digital bus.

27. The method of claim 24, and wherein said peak signal amplitudes are positive voltage levels.

28. The method of claim 24, and wherein said peak signal amplitudes are negative voltage levels.

29. The method of claim 24, and wherein said peak signal amplitudes alternate between positive and negative voltage levels.

30. A method of communicating a plurality of data signals, comprising the steps of:
generating a plurality amplitude levels discretely corresponding to a plurality of data signals;
summing said plurality of amplitude levels to produce an amplitude encoded signal;
coupling said amplitude encoded signal through a communications medium;
discriminating the amplitude of said amplitude encoded signal in accordance with one of a plurality of predetermined binary symbols, and
coupling each bit of a symbol to a discrete data signal.

31. A method of bi-directional communications of data signals, comprising the steps of:
repeatedly generating a plurality of amplitude levels discretely corresponding to a plurality of data signals;
repeatedly summing said plurality of amplitude levels to produce a first sequence of amplitude encoded signals;
synchronizing said first sequence of amplitude encoded signals with a first portion of a series of clock cycles;
coupling said first sequence of amplitude encoded signals through a communications medium;
receiving a second sequence of amplitude encoded signals from said communications medium;
discriminating the amplitude of said second sequence of amplitude encoded signals, occupying a second sequence of clock cycles, each in accordance with one of a plurality of predetermined binary symbols, and
coupling each bit of said predetermined binary symbols to a discrete data signal.

32. The method of claim 31, and wherein said first sequence of amplitude encoded signals are encoded with positive voltage levels and said second sequence of amplitude encoded signals are encoded with negative voltage levels.

33. The method of claim 31, further comprising the step of:
recovering said series of clock cycles from said second series of amplitude encoded signals.

* * * * *